(12) United States Patent
Sun et al.

(10) Patent No.: US 11,031,798 B2
(45) Date of Patent: Jun. 8, 2021

(54) CHARGER FOR ELECTRONIC CIGARETTE

(71) Applicant: Shenzhen First Union Technology Co., Ltd., Shenzhen (CN)

(72) Inventors: Xinghua Sun, Shenzhen (CN); Yonghai Li, Shenzhen (CN); Zhongli Xu, Shenzhen (CN)

(73) Assignee: Shenzhen First Union Technology Co., Ltd., Guangdong (CN)

( * ) Notice: Subject to any disclaimer, the term of this patent is extended or adjusted under 35 U.S.C. 154(b) by 650 days.

(21) Appl. No.: 15/908,425

(22) Filed: Feb. 28, 2018

(65) Prior Publication Data

US 2018/0248393 A1     Aug. 30, 2018

(30) Foreign Application Priority Data

Feb. 28, 2017   (CN) .......................... 201720184582.2
Feb. 28, 2017   (CN) .......................... 201720184985.7

(51) Int. Cl.
*A24F 47/00*    (2020.01)
*A24F 1/00*     (2006.01)
*H02J 7/00*     (2006.01)

(52) U.S. Cl.
CPC .............. *H02J 7/0045* (2013.01); *A24F 1/00* (2013.01); *A24F 47/008* (2013.01); *H02J 7/00* (2013.01); *H02J 7/0042* (2013.01)

(58) Field of Classification Search
CPC .......... H02J 7/0045; H02J 7/00; H02J 7/0042; A24F 1/00; A24F 15/015
See application file for complete search history.

(56) References Cited

U.S. PATENT DOCUMENTS

| | | | |
|---|---|---|---|
| 9,894,931 B2* | 2/2018 | Zhou | A61M 15/06 |
| 10,218,193 B2* | 2/2019 | Gratton | A24F 47/008 |
| 10,334,877 B2* | 7/2019 | Qiu | H05B 3/14 |
| 2016/0022857 A1* | 1/2016 | Esses | A61L 9/032 392/390 |
| 2016/0374395 A1 | 12/2016 | Jordan et al. | |
| 2017/0196259 A1 | 7/2017 | Beymer | |

FOREIGN PATENT DOCUMENTS

CN    205 624 475 U    10/2016
WO    2015/127429 A1    8/2015

* cited by examiner

*Primary Examiner* — Jean F Duverne
(74) *Attorney, Agent, or Firm* — Proi Intellectual Property US; Klaus Michael Schmid

(57) ABSTRACT

A charger for an electronic cigarette is disclosed including: a housing, a charging circuit in the housing, an USB input end extending outside of the housing and a charging port for charging an external power supply of the electronic cigarette; the housing includes at least two charging ports, each charging port includes an electrode of connecting the charging circuit; at least one charging port in the at least two charging ports includes an elastic element mated with an inner lateral surface thereof; when inserting the power supply of the electric cigarette into the charging port, the elastic element contacts outside the power supply by an interference fit to fix the power supply of the electric cigarette.

7 Claims, 3 Drawing Sheets

CHARGER FOR ELECTRONIC CIGARETTE

CROSS REFERENCE TO RELATED APPLICATIONS

The present application claims priority to Chinese Patent Application CN201720184985.7 filed on Feb. 28, 2017 and Chinese Patent Application CN201720184582.2 filed on Feb. 28, 2017.

TECHNICAL FIELD

The present disclosure relates to the field of an electronic cigarette, and in particular, to a charger for the electronic cigarette.

BACKGROUND ART

As a substitute of traditional cigarette, electronic cigarettes are receiving more and more concerns and becoming more and more popular for they have advantages such as easy, safe, healthy and eco-friendly to use etc. In the market, the electronic cigarettes include an atomizer and a power supply for supplying power to the atomizer. The atomizer includes an atomization assembly and a liquid storage component, the liquid storage component has an air pipe. The atomization assembly further includes an atomization unit and a base for the atomization unit carried on. When the atomization unit generates heat, the tobacco liquid in the liquid storage component is atomized to generate an aerosol, further the aerosol flows out of the electronic cigarette, simulating the effect of real cigarettes.

As known by the inventors, the power supply of the electronic cigarette has two kinds, the rechargeable or disposable. In terms of the rechargeable power supply, the charger in general has only one charging port to receive one power supply of the electronic cigarette, furthermore, the power supply of the electronic cigarette usually is connected to the charger by a screw thread, whereby it has to ensure the compatibility, with the rotation movement to devolve into inconvenience.

SUMMARY

The present disclosure is related to a charger for an electronic cigarette capable of charging at least two electronic cigarettes.

To overcome the above drawbacks, according to embodiments of the present disclosure, a charger for an electronic cigarette includes a housing, a charging circuit in the housing, an USB input end extending outside of the housing, and a charging port for charging an external power supply of the electronic cigarette. The housing has at least two charging ports, each charging port has an electrode of connecting the charging circuit.

According to embodiments of the present disclosure, at least one charging port in the at least two charging ports is connected to the power supply of the electronic cigarette by a magnetic way.

According to embodiments of the present disclosure, at least one charging port in the at least two charging ports includes a screw thread which is compatible with the power supply of the electronic cigarette.

According to embodiments of the present disclosure, at least one charging port in the at least two charging ports has an elastic element mated with an inner lateral surface thereof; when inserting the power supply of the electric cigarette into the charging port, the elastic element contacts outside the power supply by an interference fit to fix the power supply of the electric cigarette.

According to embodiments of the present disclosure, the charging port having the elastic element further includes two electrodes, convex outward from a bottom of the charging port; the two electrodes are shaped to be an elastic pin structure.

According to embodiments of the present disclosure, inner diameters of the elastic elements in at least two charging ports are dimensioned to be different.

According to embodiments of the present disclosure, a boss is provided on a surface of the elastic element contacting with the power supply of electric cigarette.

Compared to the existing technologies known to the inventors, since at least two charging ports are provided on a housing of a charger for an electronic cigarette and each charging port has an electrode of connecting the charging circuit, each charging port may contact the external power supply of the electronic cigarette separately to realize charging the electronic cigarette independently. Meanwhile, the elastic element is provided and mated with the inner lateral surface of the charging port, when inserting the power supply of the electric cigarette into the charging port, the elastic element contacts outside the power supply by an interference fit to fix the power supply of the electric cigarette. Using the elastic elements with different inner diameters, the charging ports may be suited with different outer diameters of the power supply of the electronic cigarettes, with consequently more convenience in the process of charging the power supply of the electronic cigarette.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
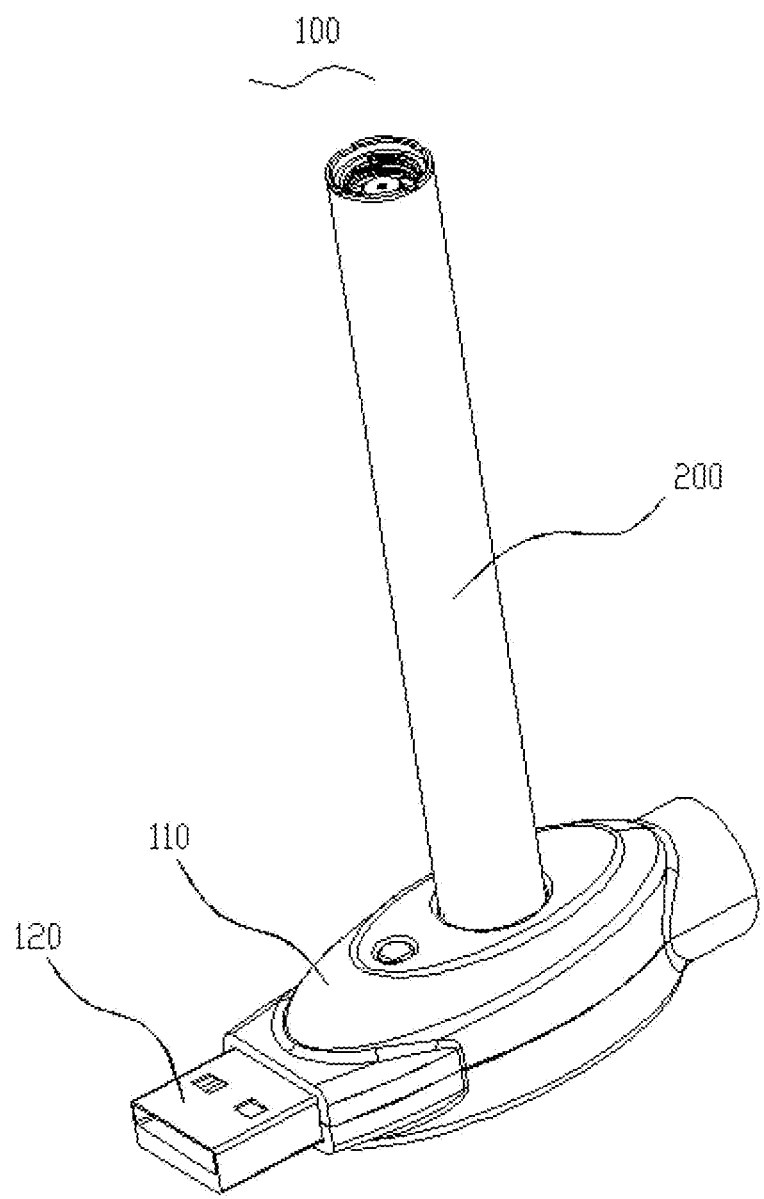
FIG. 1 is an aspect view of a charger for an electronic cigarette as well as the electronic cigarette according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Several definitions that apply throughout this disclosure will now be presented.

The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Embodiment 1

Figure 2:
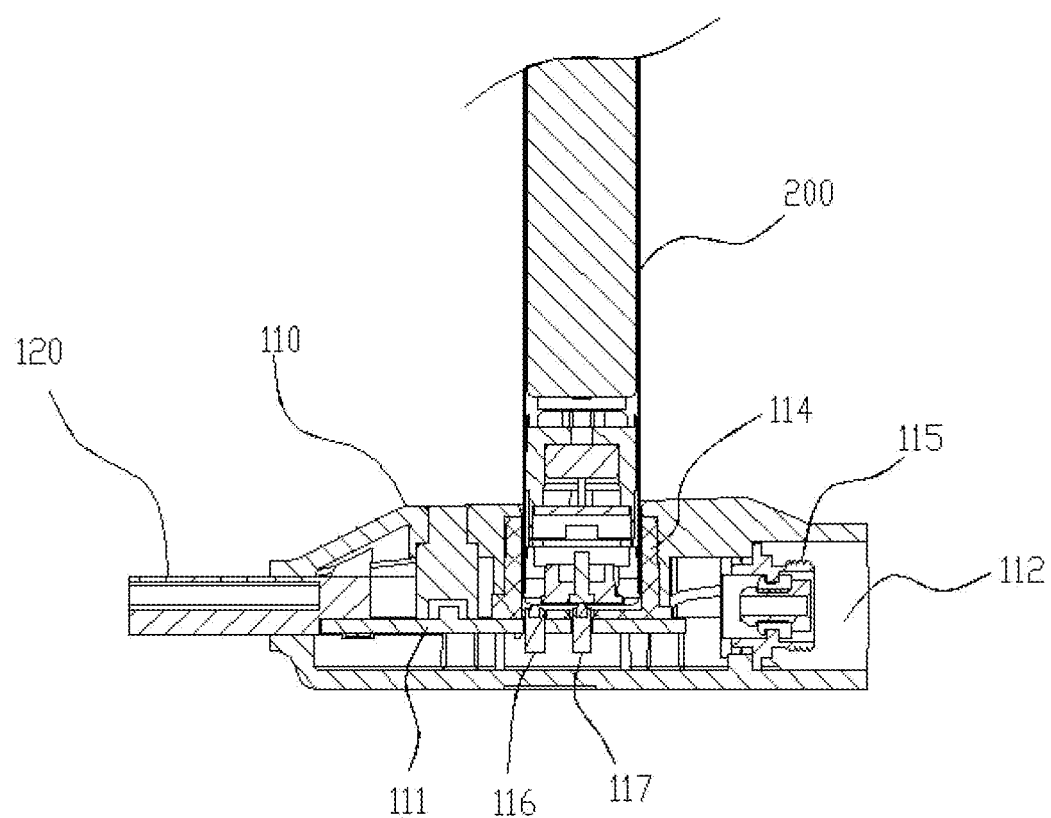
FIG. 2 is a cross-sectional view of the charger and the electronic cigarette in FIG. 1.

Referring to FIG. 1 to FIG. 2, the present disclosure is related to a charger for an electronic cigarette 100 including a housing 110, a charging circuit 111 in the housing 110, an USB input end 120 extending outside of the housing 110, and a charging port 112 for charging an external power supply 200 of the electronic cigarette. The housing 110 further has two charging ports 112, each charging port 112 has an electrode of connecting the charging circuit 111.

As shown in FIG. 2, one of the two charging port 112 has an elastic element 114 mated with an inner lateral surface thereof; the other charging port 112 includes a screw thread 115 which is compatible with the external power supply 200 of the electronic cigarette. When inserting the power supply 200 of the electric cigarette into the charging port 112 having the elastic element 114, the elastic element 114 contacts the outside of the power supply 200 by an interference fit to fix the power supply 200 of the electric cigarette.

Figure 3:
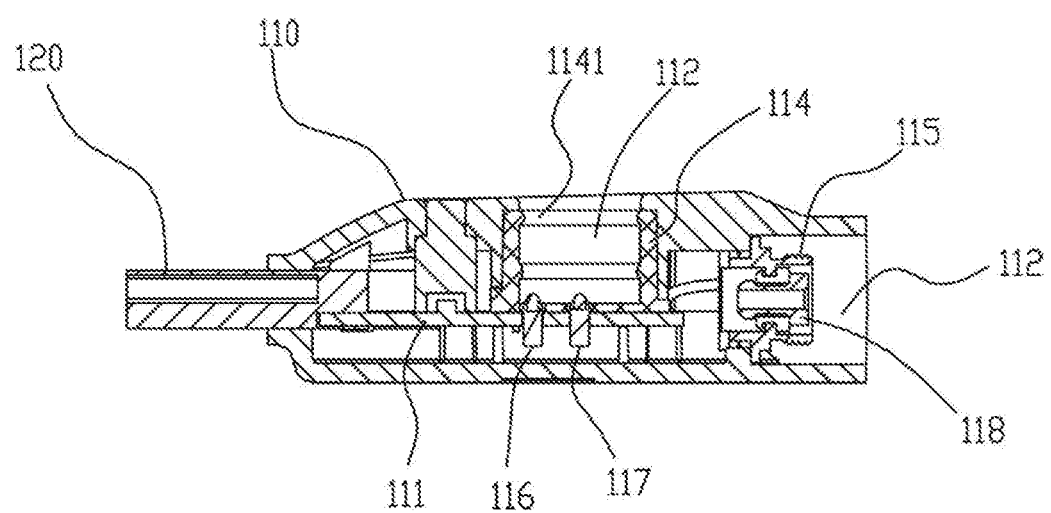
FIG. 3 is a cross-sectional view of the charger in FIG. 1.

Referring to FIG. 2 and FIG. 3, the charging port 112 having the elastic element 114 further includes two electrodes 116, 117, convex outward from a bottom of the charging port 112. The two electrodes 116, 117 are shaped to be an elastic pin structure for purpose of improving stability of electrically contacting the power supply 200 in a process of charging. Meanwhile, the two electrodes 116 in the charging port 112 having the screw thread 115 are respectively the screw thread 115 and a electrode ring 118.

As shown in FIG. 3, a boss 1141 is provided on a surface of the elastic element 114 contacting with the power supply of electric cigarette 200.

In other embodiments, at least one of the two charging ports 112 is connected to the power supply of the electronic cigarette 200 by a magnetic way. In some embodiments, inner lateral surfaces of the two charging ports 112 all have the elastic elements 114 mated with, and inner diameters of the two charging ports 112 are dimensioned to be different for fixing different outer diameters of the power supplies 200.

For the charger for the electronic cigarette 100 in the present disclosure, since at least two charging ports 112 are provided on a housing of a charger 100 and each charging port 112 has an electrode of connecting the charging circuit, each charging port 112 may contact the external power supply of the electronic cigarette 200 separately to realize charging the electronic cigarette independently. Meanwhile, the elastic element 114 is provided and mated with the inner lateral surface of the charging port 112, when inserting the power supply of the electric cigarette 200 into the charging port 112, the elastic element 114 contacts outside the power supply 200 by an interference fit to fix the power supply of the electric cigarette 200. Using the elastic elements 114 with different inner diameters, the charging ports 112 may be suited with different outer diameters of the power supplies of the electronic cigarettes 200, with consequently more convenience in the process of charging the power supply of the electronic cigarette 200.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A charger for an electronic cigarette, comprising:
a housing;
a charging circuit in the housing;
an USB input end extending outside of the housing; and
a charging port for charging an external power supply of the electronic cigarette;
wherein the housing comprises at least two charging ports, each charging port comprises an electrode of connecting the charging circuit;
wherein the charging port having the elastic element further comprises two electrodes, convex outward from a bottom of the charging port; the two electrodes are shaped to be an elastic pin structure.

2. The charger according to claim 1, wherein at least one charging port in the at least two charging ports is connected to the power supply of the electronic cigarette by a magnetic way.

3. The charger according to claim 1, wherein at least one charging port in the at least two charging ports comprises a screw thread which is compatible with the power supply of the electronic cigarette.

4. The charger according to claim 1, wherein at least one charging port in the at least two charging ports comprises an elastic element mated with an inner lateral surface thereof; when inserting the power supply of the electric cigarette into the charging port, the elastic element contacts outside the power supply by an interference fit to fix the power supply of the electric cigarette.

5. The charger according to claim 3, wherein the charging port having the screw thread further comprises two electrodes, the two electrodes are respectively the screw thread and a electrode ring.

6. The charger according to claim 4, wherein inner diameters of the elastic elements in at least two charging ports are dimensioned to be different.

7. The charger according to claim 4, wherein a boss is provided on a surface of the elastic element contacting with the power supply of electric cigarette.

* * * * *